(12) United States Patent
Hsu et al.

(10) Patent No.: US 8,614,884 B2
(45) Date of Patent: Dec. 24, 2013

(54) MODULAR DISPLAY DEVICE HAVING AT LEAST ONE DISPLAY UNIT

(75) Inventors: Yao-Wen Hsu, New Taipei (TW); Hung-Chang Liu, New Taipei (TW); Bao-Hung Chen, New Taipei (TW)

(73) Assignee: AOPEN Inc., New Taipei (TW)

( * ) Notice: Subject to any disclaimer, the term of this patent is extended or adjusted under 35 U.S.C. 154(b) by 345 days.

(21) Appl. No.: 13/046,843

(22) Filed: Mar. 14, 2011

(65) Prior Publication Data

US 2011/0222221 A1    Sep. 15, 2011

(30) Foreign Application Priority Data

Mar. 15, 2010  (TW) ............................... 99204511 U

(51) Int. Cl.
  *H05K 7/14*    (2006.01)
(52) U.S. Cl.
  USPC .................. 361/679.22; 361/679.01; 248/917
(58) Field of Classification Search
  USPC ............. 361/679.01, 679.02, 679.09, 679.08, 361/679.26, 679.27, 679.21, 679.22; 248/917–924; 312/223.1–223.2; 349/58–60

See application file for complete search history.

(56) References Cited

U.S. PATENT DOCUMENTS

| | | | | |
|---|---|---|---|---|
| 4,403,554 | A * | 9/1983 | Valentine et al. | 108/23 |
| 5,995,179 | A * | 11/1999 | Tamura et al. | 349/58 |
| 7,869,197 | B2 * | 1/2011 | Lee et al. | 361/679.01 |
| 8,042,698 | B2 * | 10/2011 | Kim et al. | 211/78 |

* cited by examiner

*Primary Examiner* — Jinhee Lee
*Assistant Examiner* — Ingrid Wright
(74) *Attorney, Agent, or Firm* — Hammer & Associates, P.C.

(57) ABSTRACT

A display device includes a base seat unit and at least one first display unit. The first display unit includes a first casing module, a first display panel connected to the first casing module, a pair of first support rods, and a pair of second support rods. The first support rods are connectible to the base seat unit in an upright direction and in a horizontally spaced apart manner, and are used to support therebetween the first casing module in a horizontal state. The second support rods are longer than the first support rods, are connectible to the base seat unit in an upright direction and in a horizontally spaced apart manner, and are used to support therebetween the first casing module in a vertical state.

22 Claims, 8 Drawing Sheets

MODULAR DISPLAY DEVICE HAVING AT LEAST ONE DISPLAY UNIT

CROSS-REFERENCE TO RELATED APPLICATION

This application claims priority of Taiwanese Application No. 099204511, filed on Mar. 15, 2010.

BACKGROUND OF THE INVENTION

1. Field of the Invention

This invention relates to a display device, more particularly to a display device that has at least one display unit and that has a modular configuration.

2. Description of the Related Art

Previously, companies used a lamp box or a poster adhered to the lamp box for advertisement purposes. Recently, due to the development of technologies, many companies advertise by playing a short film, on a display device or by combining the display device with a lamp box to achieve a better advertisement effect. However, regardless of whether the advertisement is provided on the lamp box or the display device, when the size of the lamp box or the display device is exceedingly large, not only is the framing of the advertisement difficult, the lamp box or the display device also occupies a substantial space during transport.

SUMMARY OF THE INVENTION

Therefore, an object of the present invention is to provide a display device that has a modular structure which is easy to assemble, which does not occupy a substantial space and is easy to transport, and which can economize on the use of packaging materials.

Hence, according to one aspect of the present invention, a display device comprises a base seat unit and at least one first display unit. The first display unit includes a first casing module, a first display panel connected to the first casing module, a pair of first support rods, and a pair of second support rods. The first support rods are connectible to the base seat unit in an upright direction and in a horizontally spaced apart manner, and are used to support therebetween the first casing module in a horizontal state. The second support rods are longer than the first support rods, are connectible to the base seat unit in an upright direction and in a horizontally spaced apart manner, and are used to support therebetween the first casing module in a vertical state.

According to another aspect of the present invention, a display device comprises a base seat unit, at least one first display unit, a second display unit, and an electronic display panel. The first display unit includes a first casing module, a first display panel connected to the first casing module, and a pair of first support rods and a pair of second support rods longer than the first support rods. The first support rods are connectible to the base seat unit in an upright direction and in a horizontally spaced apart manner, and are used to support therebetween the first casing module in a horizontal state. The second support rods are connected horizontally to the first casing module when the first support rods are used to support the first casing module. The second support rods are connectible to the base seat unit in an upright direction and in a horizontally spaced apart manner, and are used to support therebetween the first casing module in a vertical state. The first support rods are connected horizontally to the first casing module when the second support rods are used to support the first casing module. The second display unit includes a second casing module, and a pair of third support rods and a pair of fourth support rods longer than the third support rods. When the first casing module of the first display unit is in the horizontal state, the third support rods are connectible respectively with the first support rods of the first display unit in an upright direction and in a horizontally spaced apart manner, and are used to support therebetween the second casing module in a horizontal state and in alignment with the first display unit. When the first casing module of the first display unit is in the vertical state, the fourth support rods are connectible respectively with the second support rods of the first display unit in an upright direction and in a horizontally spaced apart manner, and are used to support therebetween the second casing module in a vertical state and in alignment with the first display unit. The electronic display panel is mounted to the second casing module.

The advantage of the present invention resides in that through the structural designs of the support rods, the casing modules of the display units can combine with support rods of different lengths to be fixed at different directions, no that the casing modules can be disposed either at a horizontal state or a vertical state. Hence, use of the display device has many variations and room for adjustment. Further, each display unit has a modular structure, and can be independently disassembled and assembled. Not only is the assembly of each display unit easy, but also after disassembly, each display unit does not occupy a substantial space so that transport of the same is convenient, and use of the packaging materials can be economized.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

The above-mentioned and other technical contents, features, and effects of this invention will be clearly presented from the following detailed description of a preferred embodiment in coordination with the reference drawings.

Figure 1:
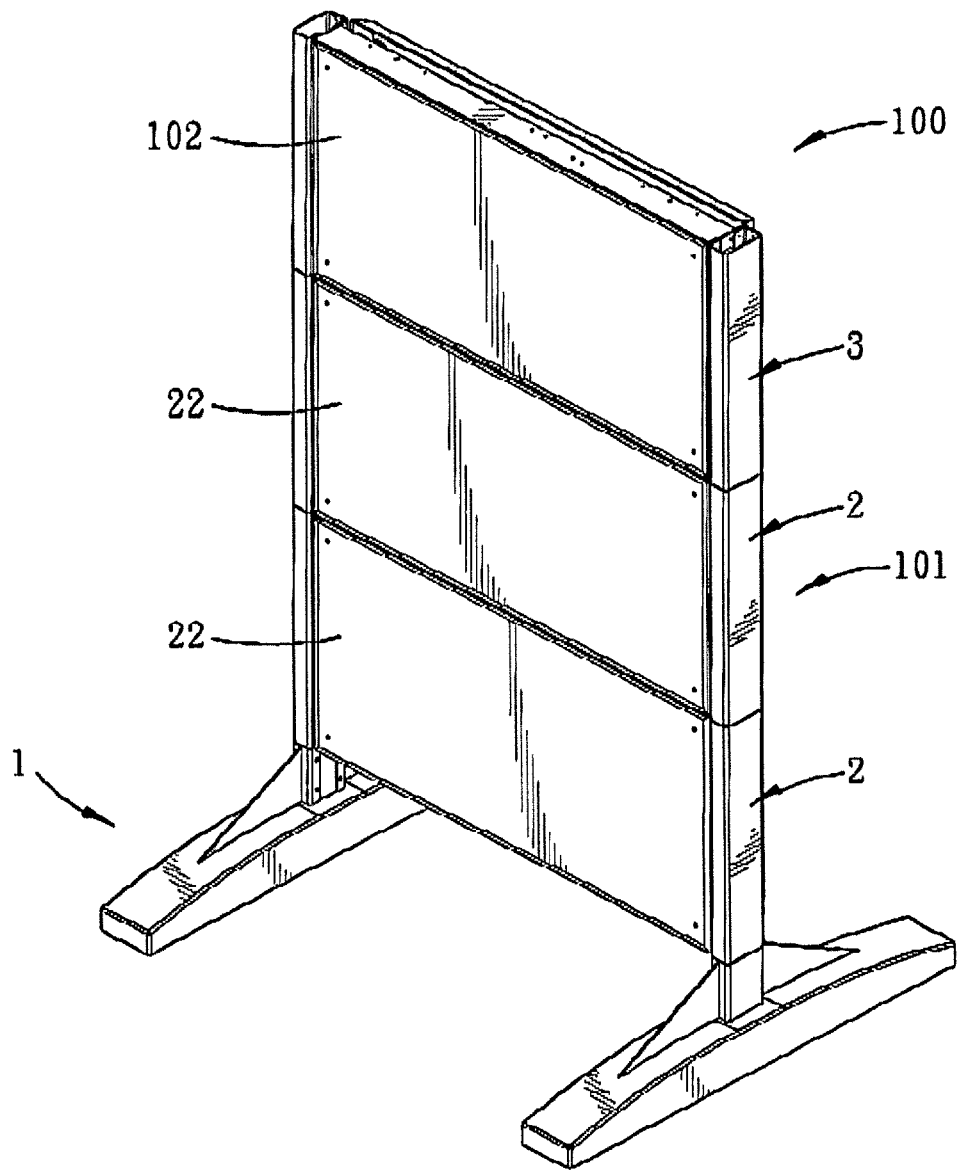
FIG. 1 is a perspective view of a display device according to the preferred embodiment of the present invention, illustrating first display panels and an electronic display panel disposed in a horizontal state.

Referring to FIG. 1, a display device 100 according to the preferred embodiment of the present invention comprises a display frame 101, an electronic display panel 102 mounted to the display frame 101, and an electronic component module 103 (see FIG. 5) for electrical connection with the electronic display panel 102. The electronic display panel 102 may be a liquid crystal display or other flat display device.

Figure 2:
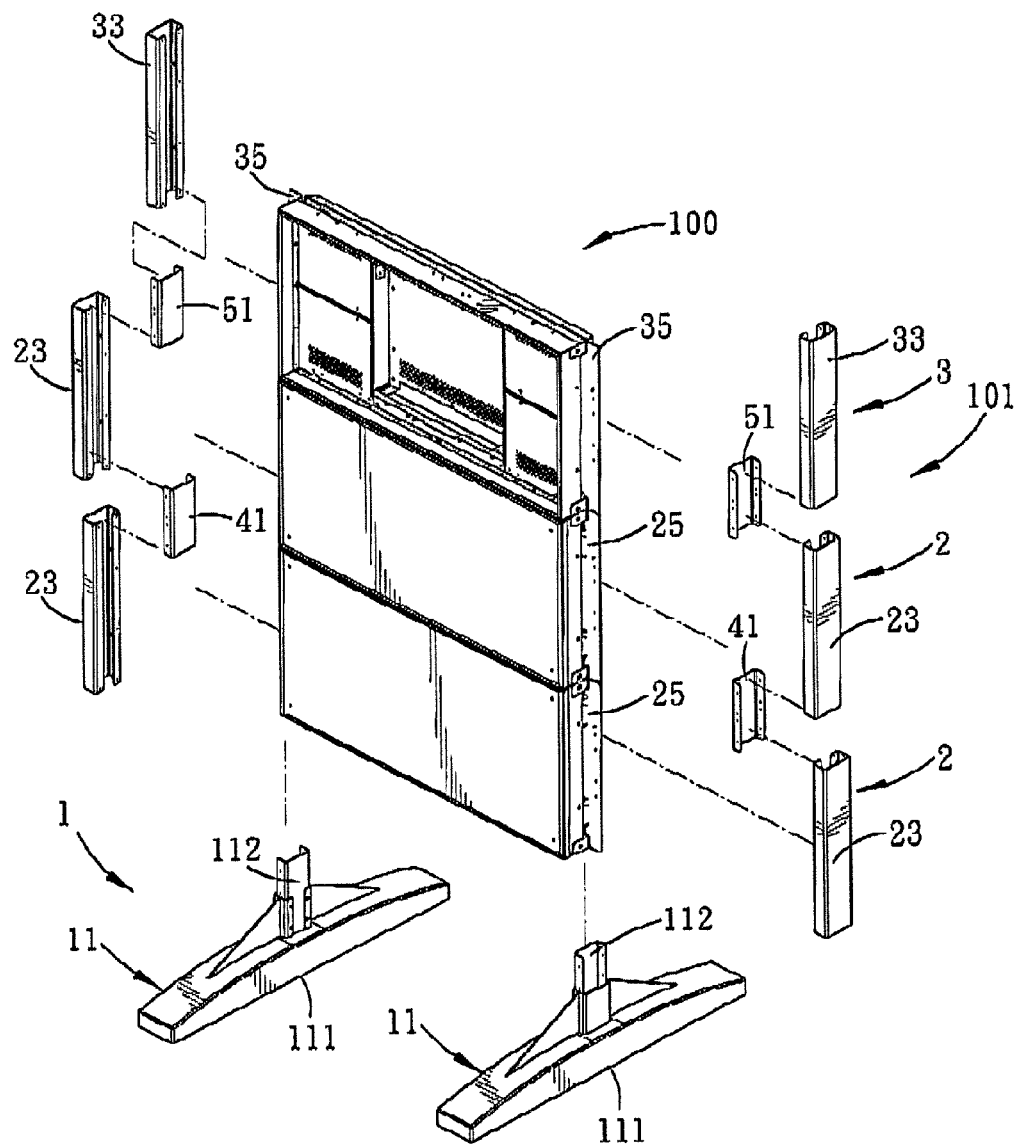
FIG. 2 is a partial exploded perspective view of the display device of the preferred embodiment.
Figure 3:
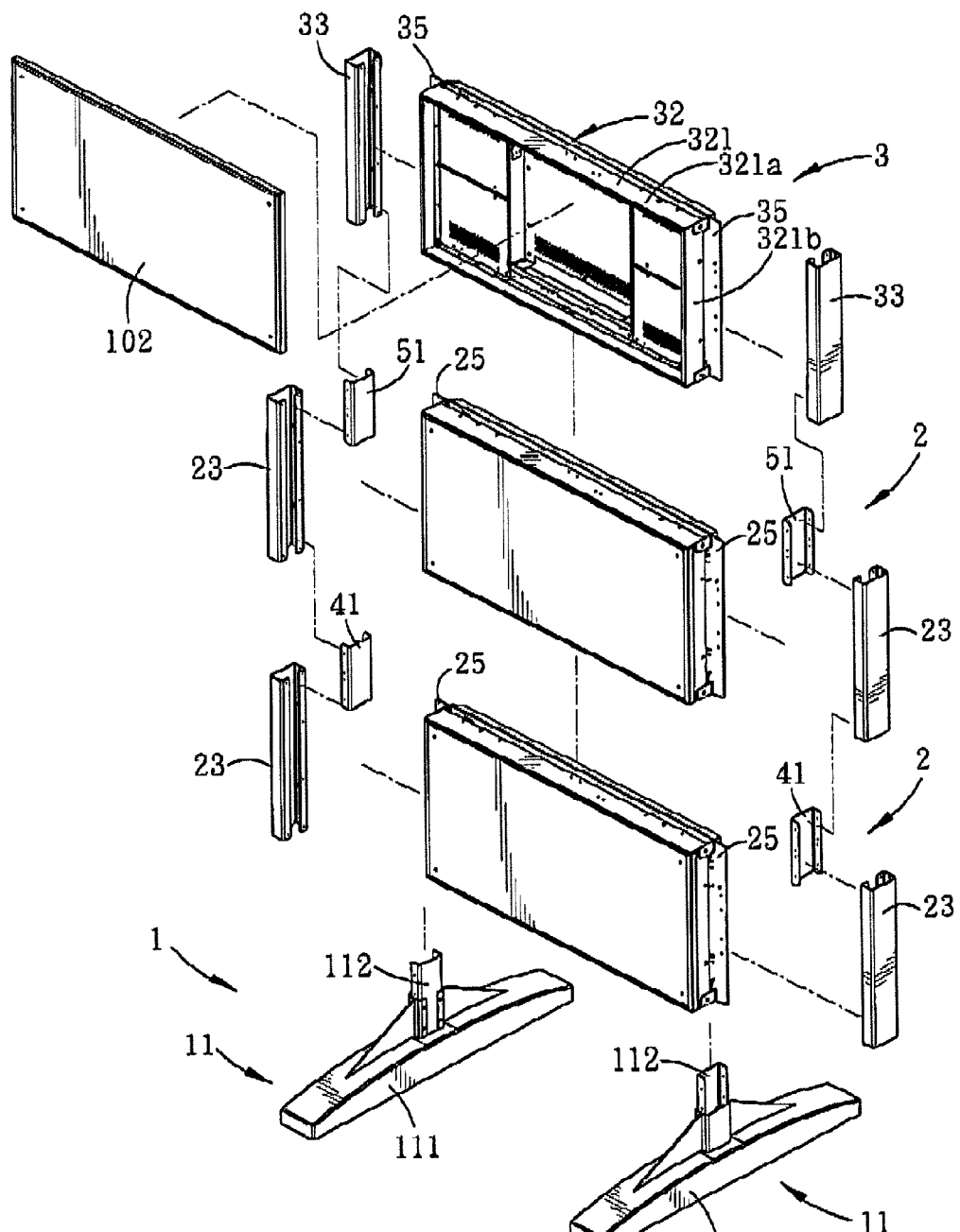
FIG. 3 is another partial exploded perspective view of the display device of the preferred embodiment.

With reference to FIGS. 1 to 3, the display frame 101 includes a base seat unit 1, two first display units 2, a second display unit 3, a pair of first connecting plates 41 for interconnecting the first display units 2, and a pair of second connecting plates 51 for interconnecting the second display unit 3 and one of the first display units 2. In this embodiment, the two first display units 2 are mounted to the base seat unit 1 one above the other and in alignment with each other. The second display unit 3 is disposed above and is aligned with a top one of the first display units 2. The two first display units 2 may be used as lamp boxes or advertisement billboards. The second display unit 3 is used for mounting of the electronic display panel 102 thereto. The electronic component module 103 (see FIG. 5) can be disposed within one of the first display units 2.

The base seat unit 1 includes two spaced-apart base seats 11. Each base seat 11 includes an elongated main body 111 extending in a front-rear direction, and a connecting portion 112 projecting upwardly from the main body 111. The connecting portion 112 may be a substantially U-shaped steel plate. The structure of the base seat unit 1 is not limited to the aforesaid disclosure.

With reference to FIGS. 3, 4, 5, and 7, in this embodiment, since the structure of the two first display units 2 is similar, only one of the first display units 2 will be described herein. The first display unit 2 includes a first casing module 21, a first display panel 22, a pair of first support rode 23, a pair of second support rods 24, a pair of first fastening plates 25, and a pair of second fastening plates 26. The first display unit 2 can selectively use the first support rods 23 and the first fastening plates 25 to dispose the first caning module 21 in a horizontal state or the second support rods 24 and the second fastening plates 26 to dispose the first casing module 21 in a vertical state. A detailed description of the method of assembly will be disclosed hereinafter. In this embodiment, each of the first and second support rods 23, 24 is configured as a substantially C-shaped steel plate. The first support rods 23 are shorter than the second support rods 24.

Figure 4:
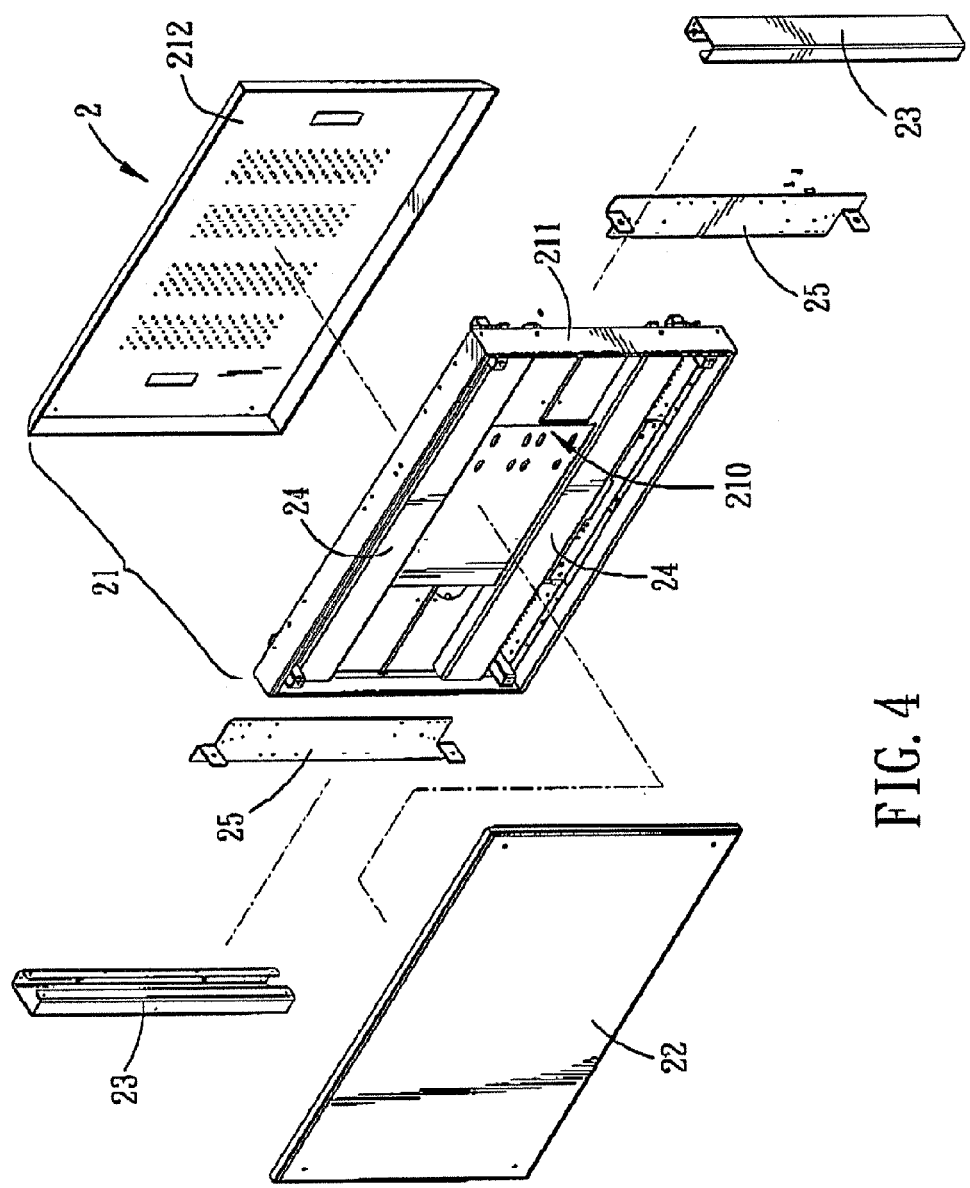
FIG. 4 is a partial exploded perspective view of a first display unit of the preferred embodiment.
Figure 5:
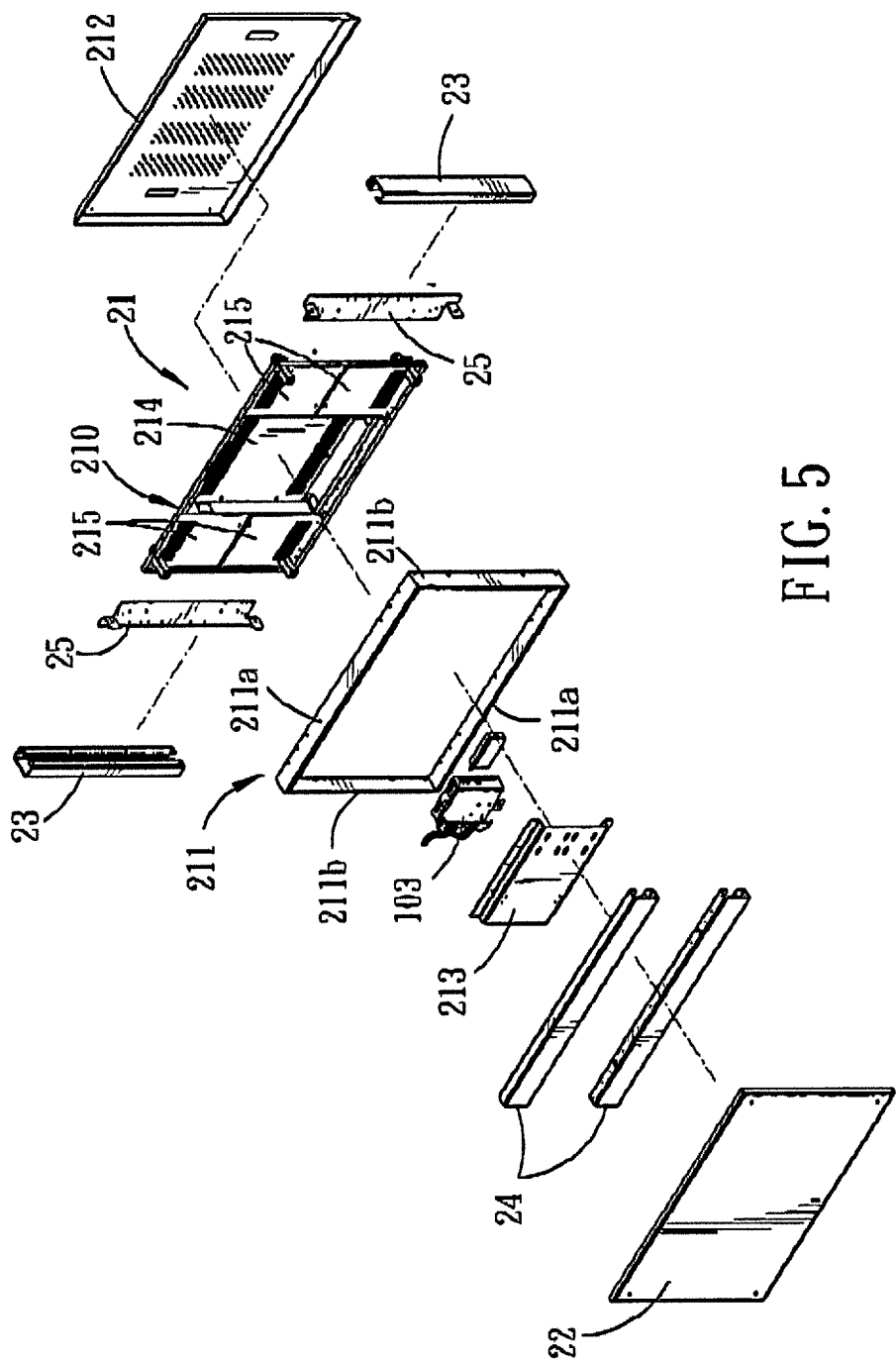
FIG. 5 is an exploded perspective view of the first display unit of the preferred embodiment.

With reference to FIGS. 4 and 5, the first casing module 21 includes an outer frame 211, a rear cover 212, and a plurality of inner casing components 210 secured within the outer frame 211. The outer frame 211 is substantially rectangular, and has a pair of opposite long frame members (211a), and a pair of short frame members (211b) connected between the long frame members (211a). The inner casing components 210 generally include a front casing 213, a rear casing 214, and a plurality of side covers 215. The rear casing 214 is connected between the long frame members (211a) of the outer frame 211. The front casing 213 is connected to a front side of the rear casing 214. The electronic component module 103 is enclosed between the front and rear casings 213, 214. In this embodiment, the electronic component module 103 is a bare bone system used for connecting electrically with the electronic display panel 102 (see FIG. 3). Each two of the side covers 215 are disposed one above the other, and are connected to one of the lateral sides of the rear casing 214 and one of the short frame members (211b) of the outer frame 211. The rear cover 212 is connected to and covers a rear side of the inner casing components 210.

In this embodiment, the first display panel 22 is rectangular, and may be a plastic flat panel. The length of each first support rod 23 is similar to that of each short side of the first display panel 22, and the length of each second support rod 24 is similar to that of each long side of the first display panel 22. The lengths of the short and long sides of the first display panel 22 are respectively similar to the lengths of the short and long frame members (211b, 211a) of the outer frame 21. The first display panel 22 and the rear cover 212 are respectively connected to the front and rear sides of the outer frame 21, and respectively define front and rear faces of the first display unit 2. The first display panel 22, the rear cover 212, and the outer frame 21 cooperatively cover the inner casing components 210 thereamong.

Figure 7:
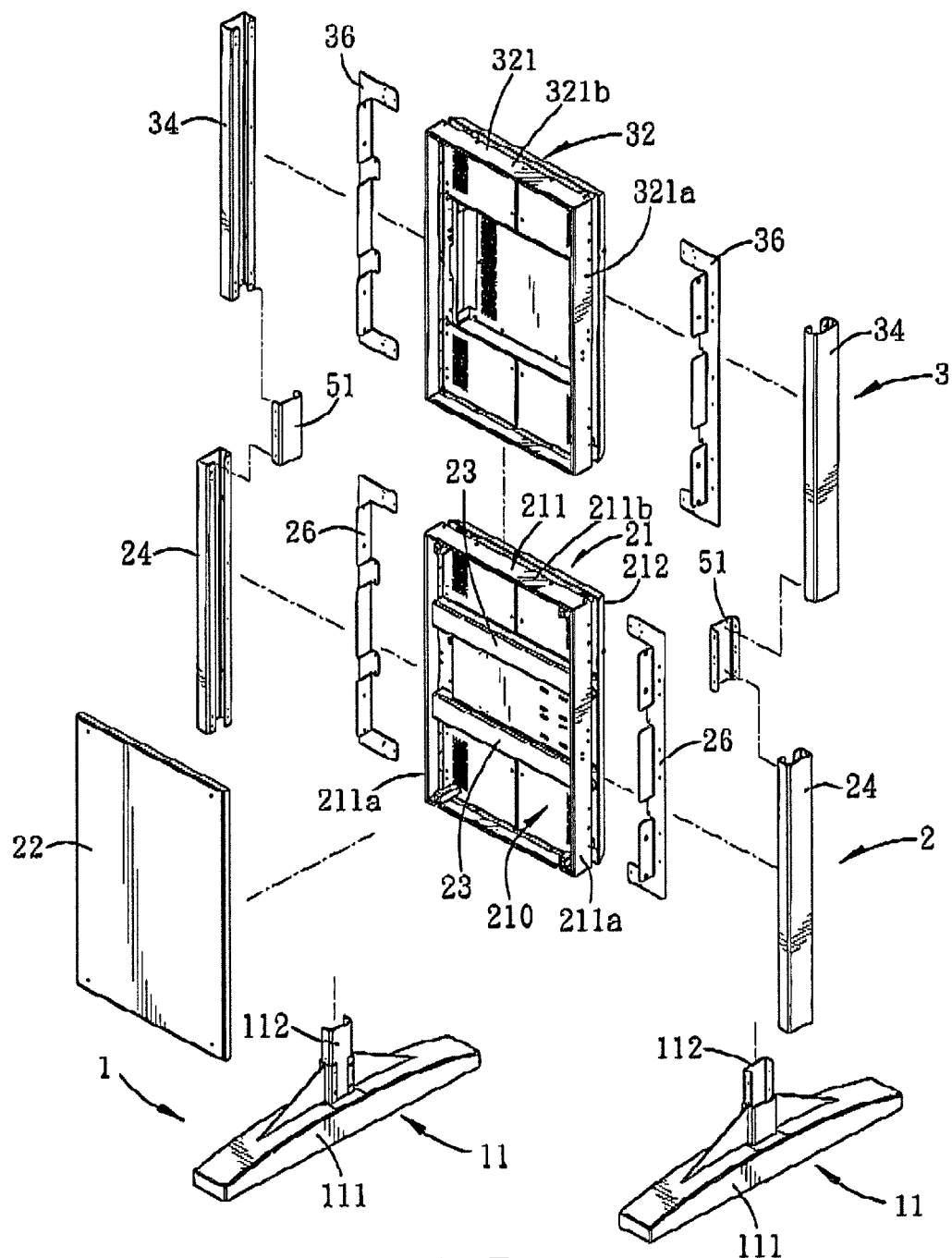
FIG. 7 is a partial exploded perspective view of the display device of FIG. 6.

Each of the first and second fastening plates 25, 26 may be configured as an elongated steel plate. With reference to FIG. 5, the length of each first fastening plate 25 is similar to that of each short frame member (211b) and each first support rod 23. The first fastening plates 25 are connected to the first casing module 21 respectively at outer sides of the short frame members (211b), and are connected respectively to the first support rods 23. That is, the first casing module 21 is connected between the first support rods 23 through the first fastening plates 25. With reference to FIG. 7, the length of each second fastening plate 26 is similar to that of each long frame member (211a) and each second support rod 24. The second fastening plates 26 are connected to the first casing module 21 respectively at outer sides of the long frame members (211a), and are connected respectively to the second support rods 24. That is, the first casing module 21 is connected between the second support rods 24 through the second fastening plates 26.

With reference to FIGS. 3 and 7, the second display unit 3 includes a second casing module 32, a pair of third support rods 33, a pair of fourth support rods 34, a pair of third fastening plates 35, and a pair of fourth fastening plates 36. In this embodiment, the components of the second casing module 32 are similar to the components of the first casing module 21, and the structure of the third support rods 33 is similar to that of the first support rods 23. Particularly, the second casing module 32 includes an outer frame 321 having a pair of opposite short frame members (321b), and a pair of long frame members (321a) connected between the short frame members (321b). The function of the third support rods 33 relative to the second casing module 32 is similar to the function of the first support rods 23 relative to the first casing module 21. The structure of the third fastening plates 35 is similar to that of the first fastening plates 25. The structure of the fourth fastening plates 36 is similar to that of the second fastening plates 26. The function of the third and fourth fastening plates 35, 36 relative to the second casing module 32 is similar to that of the first and second fastening plates 25, 26 relative to the first casing module 21. Particularly, the third fastening plates 35 are fixed to the second casing module 32 respectively at outer sides of the short frame members (321b), and the second casing module 32 is connected between the third support rods 33 through the third fastening plates 35. The fourth fastening plates 36 are fixed to the second casing module 32 respectively at outer sides of the long frame members (321a), and the second casing module 32 is connected between the fourth support rods 34 through the fourth fastening plates 36.

The electronic display panel 102 is connected to the second casing module 32.

Each of the first and second connecting plates 41, 51, in this embodiment, is configured as a substantially U-shaped steel plate. Each first connecting plate 41 is connectible to the first support rods 23 of the first display units 2 that are disposed on the same side thereof when the first casing module 21 is in the horizontal state, and is connectible to the second support rode 24 of the first display units 2 that are disposed on the same side thereof when the first casing module 21 is in the vertical state.

The pair of the first support rods 23 of the top one of the first display units 2 are connectible respectively to the pair of the third support rods 33 of the second display unit 3 through the second connecting plates 51 when the first casing modules 21 and the second casing module 32 are in the horizontal state. The pair of the second support rods 24 of the top one of the first display units 2 are connectible respectively to the pair of the fourth support rods 34 of the second display unit 3 through the second connecting plates 51 when the first casing modules 21 and the second casing module 32 are in the vertical state.

With reference to FIGS. 3 and 5, when it is desired to mount the first and second casing modules 21, 32 in the horizontal state, bottom ends of the pair of the first support rods 23 of one of the first display units 2 are first connected to the respective connecting portions 112 of the base seats 11 in an upright direction and in a horizontally spaced apart manner, after which the first support rods 23 of said one of the first display units 2 are connected to the respective first support rods 23 of the other first display unit 2 through the first connecting plates 41 so that the first display units 2 can be disposed one above the other, and the third support rods 33 of the second display unit 3 are connected to the respective first support rods 23 of a top one of the first display units 2 through the second connecting plates 51 so that the second display unit 3 can be disposed above the top one of the first display units 2. Subsequently, the first fastening plates 25 of each first display unit 2 are first connected to the outer sides of the respective short frame members (211b) and two of the side covers 215 of the inner casing components 210, and are then connected to the first support rods 23 of a respective first display unit 2, thereby positioning the first casing module 21 of each first display unit 2 between the first support rods 23 thereof. Similarly, the second casing module 32 is positioned between the third support rods 33 by interconnecting the second fastening plates 35 with the respective third support rods 33. As shown in FIG. 1, the two first display units 2 and the second display unit 3 are connected to the base seat unit 1 in a top-bottom direction and in alignment with each other, and form a three-layer structure. At this time, the long frame members (211a) of the first casing modules 21 of the first display units 2 and the long frame members (321a) of the second casing module 32 of the second display unit 3 are horizontal.

When a bottom one of the first display units 2 is connected to the base seat unit 1 through the first support rods 23 thereof, the pair of the second support rods 24 of each first display unit 2 can be connected to the inner casing components 210 and disposed between the first display panel 22 and the rear cover 212. For example, the two second support rods 24 can be connected horizontally to a front side of the inner casing components 210 and spaced apart from each other in a top-bottom direction (see FIG. 4). Through such a configuration, the second support rods 24 not only can be hidden, but also can strengthen the structure of the first caning module 21.

Figure 6:
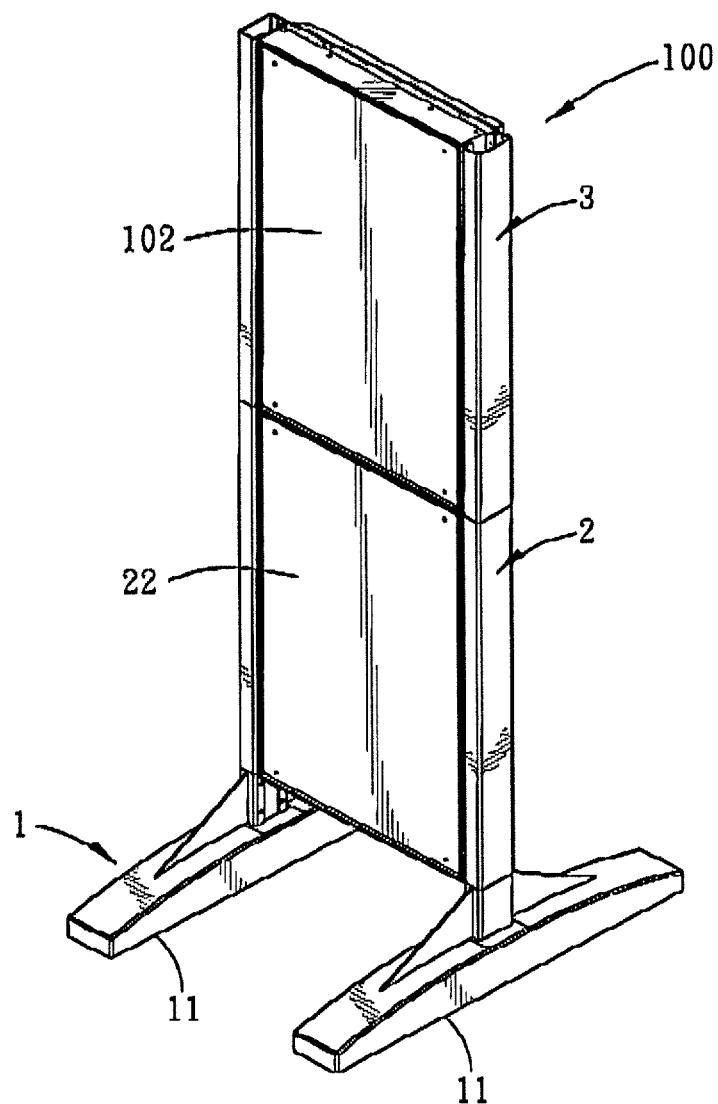
FIG. 6 is a perspective view of an alternative form of the display device of the present invention.
Figure 8:
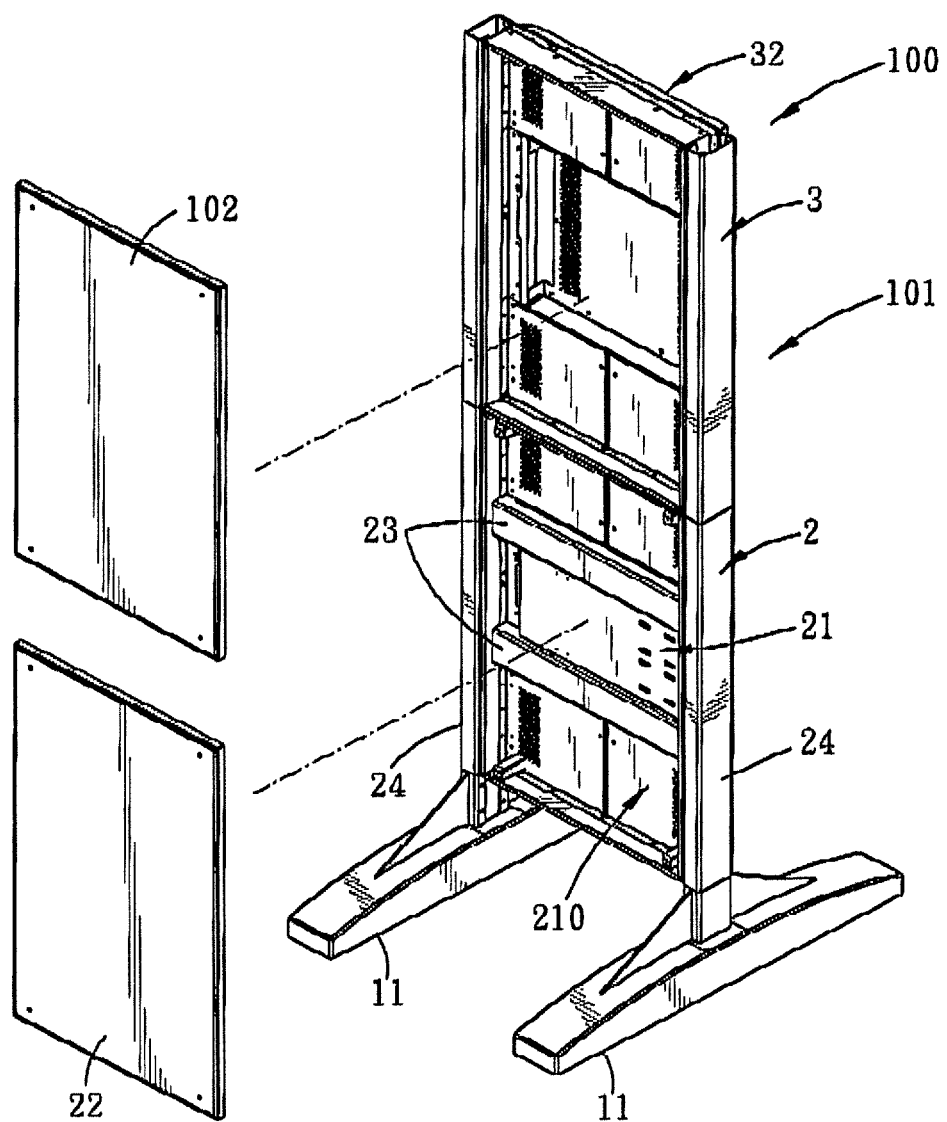
FIG. 8 is a view similar to FIG. 6, but illustrating a first display panel and an electronic display panel in a state separated from the display device.

With reference to FIGS. 6 to 8, assembly of the first and second casing modules 21, 22 in the vertical state will be described below. However, it should be noted that, in consideration of the height of the display frame 101, only one first display unit 2 is employed.

During assembly, bottom ends of the second support rods 24 of the first display unit 2 are first connected to the respective connecting portions 112 of the base seats 11 of the base seat unit 1 in an upright direction and in a horizontally spaced apart manner, after which the fourth support rods 34 are connected respectively to the second support rods 24 through the second connecting plates 51. Thereafter, the third fastening plates 26 are connected respectively to the long frame members (211a) of the outer frame 211, the inner casing components 210, and the respective second support rods 24. Similarly, the fourth fastening plates 36 of the second display unit 3 are connected to the respective long frame members (321a) of the outer frame 321 of the second casing module 32 and the respective fourth support rods 34, so that the second casing module 32 is connected between the fourth support rods 34. As shown in FIG. 6, the first and second display units 2, 3 are aligned to each other in a top-bottom direction, and are disposed above the base seats 11. At this time, the short frame members (211b) of the first casing module 21 of the first display unit 2 and the short frame members (321b) of the second casing module 32 of the second display unit 3 are horizontal.

When the first display unit 2 is connected to the base seats 11 through the second support rods 24, the pair of the first support rods 23 of the first display unit 2 can be connected to the inner casing components 210 and disposed between the first display panel 22 and, the rear cover 212. For example, the two first support rods 23 can be connected horizontally to the front side of the inner casing components 210 in a spaced apart top-bottom direction, as best shown in FIG. 7. Through such a configuration, the first support rods 23 not only can be hidden, but also can strengthen the structure of the first casing module 21.

Additionally, if the height of the display frame 101 is not to be considered, another first display unit 2 can be connected between the first and second display units 2, 3 shown in FIG. 6 to form a three-layer structure. The connection thereof is similar to that described in interconnecting the two first display units 2 shown in FIG. 2 through the first connecting plates 41.

Furthermore, during use of the display frame 101, the display frame 101 may only support two first display units 2, and the first display panel 22 of one or both of the first display units 2 may be an electronic display panel of a liquid crystal display.

Moreover, in this embodiment, the pair of each of the first to fourth support rods 23, 24, 33, 34 are connected to the first casing module 21 of each first display unit 2 through the respective first to fourth fastening plates 25, 26, 35, 36. Alternatively, the pair of each of the first to fourth support rods 23, 24, 33, 34 may be connected directly to the first casing module 21 of each first display unit 2 dispensing with the need for the respective first to fourth fastening plates 25, 26, 35, 36.

From the aforesaid description of the preferred embodiment, the present invention uses the structural configurations of the first to fourth support rods 23, 24, 33, 34 and the first to fourth fastening plates 25, 26, 35, 36 to alter the connecting direction of the first and second casing modules 21, 32 to suit a requirement, thereby changing the direction of the first and second casing modules 21, 32 and thus the first display panel 22 and the electronic display panel 102. Hence, the use of the display device 100 has many variations and room for adjustment. Further, because the display frame 101 can be disassembled into the base seat unit 1 and the modular first and second display units 2, 3, and the first and second casing modules 21, 32 of the first and second display units 2, 3 can also be disassembled, assembly of the whole display device 100 is not only easy, these elements do not occupy a substantial space so that transport is easy, and use of packaging materials can be economized. Therefore, the object of the present invention can be realized.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A display device, comprising:
a base seat unit; and
at least one first display unit including
a first casing module,
a first display panel connected to said first casing module,
a pair of first support rods connectible to said base seat unit in an upright direction and in a horizontally spaced apart manner, said first support rods being used to support therebetween said first casing module in a horizontal state, and
a pair of second support rods that are longer than said first support rods and that are connectible to said base seat unit in an upright direction and in a horizontally spaced apart manner, said second support rods being used to support therebetween said first casing module in a vertical state,
wherein said first casing module includes an outer frame having a pair of opposite short frame members, and a pair of long frame members connected between said short frame members, said short frame members being horizontal when said first casing module is in said vertical state, said long frame members being horizontal when said first casing module is in said horizontal state.

2. The display device of claim 1, wherein said first display unit further includes a pair of first fastening plates, said first fastening plates being fixed to said first casing module respectively at outer sides of said short frame members when said first casing module is in said horizontal state, said first casing module being connected to said first support rods through said first fastening plates.

3. The display device of claim 2, wherein said display device comprises two said first display units, and further comprises a pair of first connecting plates, said first display units being disposed one above the other through said first connecting plates, each of said first connecting plates being connectible to said first support rods of said first display units that are disposed on the same side thereof when said first casing module is in said horizontal state, each of said first connecting plates being connectible to said second support rods of said first display units that are disposed on the same side thereof when said first casing module is in said vertical state.

4. The display device of claim 3, wherein said first casing module of each of said first display units further includes a rear cover and a plurality of inner casing components, said inner casing components being secured within said outer frame of said first casing module of a respective said first display unit and being adapted to fix an electronic component module thereto, said rear cover being connected to and covering said inner casing components, said rear cover and said first display panel of each of said first display units respectively defining rear and front faces of the respective said first display unit.

5. The display device of claim 4, wherein said inner casing components include a front casing, a rear casing, and a plurality of side covers, said rear casing being connected between said long frame members of said outer frame, said front casing being connected to a front side of said rear casing, said front and rear casings being adapted to enclose therebetween the electronic component module, each of said side covers being connected to a lateral side of said rear casing and one of said short frame members of said outer frame.

6. The display device of claim 3, further comprising a second display unit which includes
a second casing module adapted for mounting thereto an electronic display panel, and
a pair of third support rods and a pair of fourth support rods that are longer than said third support rods,
when said first casing module of each of said first display units is in said horizontal state, said third support rods are connectible respectively with said first support rods of one of said first display units in an upright direction and in a horizontally spaced apart manner, said third support rods being used to support therebetween said second casing module in a horizontal state and in alignment with said first display units,
when said first casing module of each of said first display units is in said vertical state, said fourth support rods are connectible respectively with said second support rods of one of said first display units in an upright direction and in a horizontally spaced apart manner, said fourth support rods being used to support therebetween said second casing module in a vertical state and in alignment with said first display units.

7. The display device of claim 6, wherein said second casing module includes an outer frame having a pair of opposite short frame members, and a pair of long frame members connected between said short frame members of said second casing module, said short frame members being horizontal when said second casing module is in said vertical state, said long frame members being horizontal when said second casing module is in said horizontal state.

8. The display device of claim 7, wherein said second display unit further includes a pair of third fastening plates, said third fastening plates being fixed to said second casing module respectively at outer sides of said short frame members of said second casing module when said second casing module is in said horizontal state, said second casing module being connected to said third support rods through said third fastening plates.

9. The display device of claim 8, wherein said second display unit further includes a pair of second connecting plates, the pair of said first support rods of one of said first display units being connectible respectively to the pair of said third support rods of said second display unit through said second connecting plates when said first casing module and said second casing module are in said horizontal state, the pair of said second support rods of one of said first display units being connectible respectively to the pair of said fourth support rods of said second display unit through said second connecting plates when said first casing module and said second casing module are in said vertical state.

10. The display device of claim 9, wherein, when said first casing module of each of said first display units is in said horizontal state, said second support rods are connected horizontally to said first casing module, and when said first casing module of each of said first display units is in said vertical state, said first support rods are connected horizontally to said first casing module.

11. The display device of claim 7, wherein said second display unit further includes a pair of fourth fastening plates, said fourth fastening plates being fixed to said second casing module respectively at outer sides of said long frame members when said second casing module is in said vertical state, said second casing module being connected to said fourth support rods through said fourth fastening plates.

12. The display device of claim 1, wherein said first display unit further includes a pair of second fastening plates, said second fastening plates being fixed to said first casing module respectively at outer sides of said long frame members when said first casing module is in said vertical state, said first casing module being connected to said second support rods through said second fastening plates.

13. A display device comprising:
a base seat unit;
at least one first display unit including
a first casing module,
a first display panel connected to said first casing module, and
a pair of first support rods and a pair of second support rods longer than said first support rods, said first support rods being connectible to said base seat unit in an upright direction and in a horizontally spaced apart manner, said first support rods being used to support therebetween said first casing module in a horizontal state and said second support rods being connected horizontally to said first casing module when said first support rods are used to support said first casing module, and
said second support rods being connectible to said base seat unit in an upright direction and in a horizontally spaced apart manner, said second support rods being used to support therebetween said first casing module in a vertical state and said first support rods being connected horizontally to said first casing module when said second support rods are used to support said first casing module;
a second display unit including
a second casing module, and
a pair of third support rods and a pair of fourth support rods that are longer than said third support rods,
when said first casing module of said first display unit is in said horizontal state, said third support rods are connectible respectively with said first support rods of said first display unit in an upright direction and in a horizontally spaced apart manner, said third support rods being used to support therebetween said second casing module in a horizontal state and in alignment with said first display unit, and
when said first casing module of said first display unit is in said vertical state, said fourth support rods are connectible respectively with said second support rods of said first display unit in an upright direction and in a horizontally spaced apart manner, said fourth support rods being used to support therebetween said second casing module in a vertical state and in alignment with said first display unit; and
an electronic display panel mounted to said second casing module,
wherein said first casing module includes an outer frame having a pair of opposite short frame members, and a pair of long frame members connected between said short frame members, said short frame members being horizontal when said first casing module is in said vertical state, said long frame members being horizontal when said first casing module is in said horizontal state.

14. The display device of claim 13, wherein said first display unit further includes a pair of first fastening plates, said first fastening plates being fixed to said first casing module respectively at outer sides of said short frame members when said first casing module is in said horizontal state, said first casing module being connected to said first support rods through said first fastening plates.

15. The display device of claim 14, wherein said display device comprises two said first display units, and further comprises a pair of first connecting plates, said first display units being disposed one above the other through said first connecting plates, each of said first connecting plates being connectible to said first support rods of said first display units that are disposed on the same side thereof when said first casing module is in said horizontal state, each of said first connecting plates being connectible to said second support rods of said first display units that are disposed on the same side thereof when said first casing module is in said vertical state.

16. The display device of claim 15, further comprising an electronic component module used for electrical connection with said electronic display panel, said first casing module of each of said first display units further including a rear cover and a plurality of inner casing components, said inner casing components being secured within said outer frame of said first casing module of a respective said first display unit, said electronic component module being fixed to said inner casing components, said rear cover being connected to and covering said inner casing components, said rear cover and said first display panel of each of said first display units respectively defining rear and front faces of the respective said first display unit.

17. The display device of claim 16, wherein said inner casing components include a front casing, a rear casing, and a plurality of side covers, said rear casing being connected between said long frame members of said outer frame, said front casing being connected to a front side of said rear casing, said front and rear casings enclosing therebetween said electronic component module, each of said side covers being connected to a lateral side of said rear casing and one of said short frame members of said outer frame.

18. The display device of claim 15, wherein said second casing module includes an outer frame having a pair of opposite short frame members, and a pair of long frame members connected between said short frame members of said second casing module, said short frame members being horizontal when said second casing module is in said vertical state, said long frame members being horizontal when said second casing module is in said horizontal state.

19. The display device of claim 18, wherein said second display unit further includes a pair of third fastening plates, said third fastening plates being fixed to said second casing module respectively at outer sides of said short frame members of said second casing module when said second casing module is in said horizontal state, said second casing module being connected to said third support rods through said third fastening plates.

20. The display device of claim 19, further comprising a pair of second connecting plates, the pair of said first support rods of one of said first display units being connectible respectively to the pair of said third support rods of said second display unit through said second connecting plates when said first casing module and said second casing module are in said horizontal state, the pair of said second support rods of one of said first display units being connectible respectively to the pair of said fourth support rods of said second display unit through said second connecting plates when said first casing module and said second casing module are in said vertical state.

21. The display device of claim 18, wherein said second display unit further includes a pair of fourth fastening plates, said fourth fastening plates being fixed to said second casing module respectively at outer sides of said long frame members when said second casing module is in said vertical state, said second casing module being connected to said fourth support rods through said fourth fastening plates.

22. The display device of claim 13, wherein said first display unit further includes a pair of second fastening plates, said second fastening plates being fixed to said first casing module respectively at outer sides of said long frame members when said first casing module is in said vertical state, said first casing module being connected to said second support rods through said second fastening plates.

* * * * *